United States Patent

Taylor et al.

(10) Patent No.: US 10,401,855 B2
(45) Date of Patent: Sep. 3, 2019

(54) INCEPTOR APPARATUS

(71) Applicant: BAE SYSTEMS plc, London (GB)

(72) Inventors: Adam Taylor, Rochester (GB); Jason Howard Bean, Rochester (GB)

(73) Assignee: BAE SYSTEMS plc, London (GB)

( * ) Notice: Subject to any disclaimer, the term of this patent is extended or adjusted under 35 U.S.C. 154(b) by 278 days.

(21) Appl. No.: 15/313,638

(22) PCT Filed: May 19, 2015

(86) PCT No.: PCT/GB2015/051456
§ 371 (c)(1),
(2) Date: Nov. 23, 2016

(87) PCT Pub. No.: WO2015/181525
PCT Pub. Date: Dec. 3, 2015

(65) Prior Publication Data
US 2017/0212514 A1  Jul. 27, 2017

(30) Foreign Application Priority Data

May 28, 2014  (GB) .................................. 1409409.8

(51) Int. Cl.
G05D 1/00 (2006.01)
B64C 13/04 (2006.01)
(Continued)

(52) U.S. Cl.
CPC .......... *G05D 1/0077* (2013.01); *B64C 13/04* (2013.01); *B64C 13/14* (2013.01); *B64C 13/46* (2013.01);
(Continued)

(58) Field of Classification Search
CPC .......... G05D 1/0077; G05G 1/04; G05G 5/12; G05G 9/047; G05G 2700/02;
(Continued)

(56) References Cited

U.S. PATENT DOCUMENTS 5,209,661 A * 5/1993 Hildreth ................... G05G 5/03
244/223
5,735,490 A * 4/1998 Berthet .................. B64C 13/04
244/223

(Continued)

FOREIGN PATENT DOCUMENTS

EP  0759585 A1  2/1997
GB  2509091 A   6/2014

(Continued)

OTHER PUBLICATIONS

International Preliminary Report on Patentability received for Patent Application No. PCT/GB2015/051456, dated Dec. 8, 2016. 7 pages.

(Continued)

*Primary Examiner* — Valentina Xavier
(74) *Attorney, Agent, or Firm* — Finch & Maloney PLLC

(57) ABSTRACT

An active inceptor apparatus and method for operating a machine. The apparatus comprises a stick member having a grip portion, the stick member being pivotably mounted relative to a housing. It further comprises a position sensor responsive to, and for generating signals indicative of, stick member position. A force sensor is provided on the stick member responsive to, and for generating signals indicative of, force applied to the stick by a user. The apparatus also includes a control unit operable to receive the position and force signals from the position and force sensors respectively. The control unit is operable to process the signals according to a predetermined relationship to determine a value FD indicative of force applied to the stick member relative to displacement of the stick member. The control unit is also operable to generate machine control signals as a function of position signals and force signals in depen- (Continued)

dence upon the value FD, for communication to the machine.

20 Claims, 2 Drawing Sheets

(51) Int. Cl.
G05G 9/047 (2006.01)
B64C 13/14 (2006.01)
B64C 13/46 (2006.01)
B64C 13/50 (2006.01)
G05G 1/04 (2006.01)
G05G 5/12 (2006.01)

(52) U.S. Cl.
CPC ............. *B64C 13/503* (2013.01); *G05G 1/04* (2013.01); *G05G 5/12* (2013.01); *G05G 9/047* (2013.01); *G05G 2009/04718* (2013.01); *G05G 2009/04748* (2013.01); *G05G 2009/04751* (2013.01); *G05G 2009/04762* (2013.01); *G05G 2009/04777* (2013.01); *G05G 2505/00* (2013.01); *G05G 2700/02* (2013.01)

(58) Field of Classification Search
CPC ..... G05G 2505/00; G05G 2009/04777; G05G 2009/04751; G05G 2009/04762; G05G 2009/04748; G05G 2009/04718; B64C 13/14; B64C 13/503; B64C 13/46; B64C 13/04

See application file for complete search history.

(56) References Cited

U.S. PATENT DOCUMENTS

| 6,253,136 | B1 | 6/2001 | Stratton et al. | |
| 2005/0205311 | A1 | 9/2005 | Yanaka et al. | |
| 2009/0266939 | A1* | 10/2009 | Hanlon | B64C 13/46 244/223 |
| 2012/0053762 | A1* | 3/2012 | Stiefenhofer | B64C 13/10 701/3 |
| 2017/0313408 | A1* | 11/2017 | Sheffer | B64C 13/18 |

FOREIGN PATENT DOCUMENTS

| WO | 2004021330 A1 | 3/2004 |
| WO | 2015181525 A2 | 12/2015 |

OTHER PUBLICATIONS

International Search Report and Written Opinion received for Patent Application No. PCT/GB2015/051456, dated Dec. 18, 2015. 10 pages.

GB Intellectual Property Office Search Report under Section 17(5) received for GB Patent Application No. 1409409.8 dated Dec. 12, 2014. 3 pages.

GB Intellectual Property Office Combined Search and Examination Report under Section 17 and 18(3) received for GB Patent Application No. 1508553.3 dated Oct. 30, 2015. 6 pages.

* cited by examiner

INCEPTOR APPARATUS

The present disclosure relates to an inceptor apparatus for operating a machine.

BACKGROUND

It is known to control machines, for example land, sea or air vehicles, using stick controllers. In particular, aircraft are fitted with passive stick controllers (i.e. inceptors or "joy sticks").

For aircraft, there are currently two types of side stick controllers in use that provide pilot inputs into a vehicle's control system (e.g. its Flight Control System). One type is "passive" and the other is "active".

Passive inceptors have fixed force/feel characteristic that are provided by springs and dampers, but do not provide tactile cues about the aircraft's current situation to the pilots. Flight control systems that use passive side sticks rely on the flight control laws within the aircraft's Flight Control System to keep the aircraft within a safe operating envelope. That is, the Flight Control System does not allow the aircrafts' limits to be exceeded, whatever inputs the pilot applies to the system via the sticks control. This is sometimes referred to as "carefree" handling.

Active inceptors are more complex. In addition to springs and dampers that are used to provide a reversionary force/feel characteristic, they also have a servo-actuator mechanism that allows the force/feel characteristic of the stick to be continuously modified throughout a flight.

Movement of either passive or active inceptors generates positional information which is interpreted to control the vehicle. If the inceptor mechanism jams (for example, due to mechanical failure) then the operator is not able to move the inceptor, and hence no positional data will be generated and the vehicle cannot be controlled.

For land or water based vehicles, while serious, this problem may be mitigated by shutting down the vehicle so as to come to a halt. For many aircraft, the problem may be mitigated by provision of a second set of controls, which is commonplace as many air vehicles have two flight control positions, and the chance of both failing at the same time is very small.

However, for aircraft having only one set of controls, or dispatched with only one pilot, there is a customer need to further mitigate the problem of inceptor jamming.

Hence an inceptor apparatus with a failsafe which provides for control of a vehicle (for example an aircraft) in the event of the inceptor becoming physically immovable, and hence unable to produce positional inputs to a control system for the aircraft, is highly desirable.

SUMMARY OF THE INVENTION

According to the present disclosure there is provided apparatus and method as set forth in the appended claims. Other features of the invention will be apparent from the dependent claims, and the description which follows.

Accordingly there may be provided an active inceptor apparatus for operating a machine, the apparatus comprising: a stick member having a grip portion, the stick member being pivotably mounted relative to a housing; a position sensor responsive to, and for generating signals indicative of, stick member position; a force sensor provided on the stick member responsive to, and for generating signals indicative of, force applied to the stick by a user; a control unit operable to receive the position and force signals from the position and force sensors respectively; operable to process the signals according to a predetermined relationship to determine a value FD indicative of force applied to the stick member relative to displacement of the stick member; and operable to generate machine control signals as a function of position signals and force signals in dependence upon the value FD, for communication to the machine.

The control unit may be operable to generate control signals in dependence upon the force signals and position signals when the value FD is below a predetermined tolerance limit.

The control unit may be operable to generate control signals in dependence upon position signals but not force signals when the value FD is below a predetermined tolerance limit.

The control unit may be operable to generate control signals in dependence upon the force signals but not position signals when the value FD exceeds the predetermined tolerance limit.

The stick member may be coupled to an actuator operable in response to a signal from the control unit.

The actuator may be operable to urge the stick member to a predetermined position in response to a signal received from the control unit.

The actuator may be operable to be locked in position relative to the housing, thereby locking the stick member into position in response to a signal received from the control unit.

The actuator may be operable to be disabled in response to a signal received from the control unit.

The stick member may be operable to pivot in a first direction and second direction, the first direction being perpendicular to the second direction.

There may be provided a vehicle control apparatus comprising an inceptor apparatus as described in any one of the preceding claims.

There may also be provided a method of operating an inceptor apparatus for controlling a machine according to the present disclosure, comprising the steps of receiving position and force signals from the position and force sensors respectively; determining a value FD indicative of force applied to the stick member relative to displacement of the stick member generating machine control signals as a function of position signals and force signals in dependence upon the value FD for communication to the machine.

The control unit may generate a control signal in dependence upon the force signals and position signals when the value FD is below a predetermined tolerance limit.

During the step of generating machine control signals, the control unit may apply a first variable gain multiplier to force signals, and may apply a second variable gain multiplier to position signals, the values of the gain multipliers being varied relative to one another in dependence upon the position signal.

The control unit may generate control signals in dependence upon the position signals but not force signals when the value FD is below a predetermined tolerance limit.

The control unit may generate control signals in dependence upon the force signals but not position signals when the value FD exceeds the predetermined tolerance limit.

The control unit may generate signals for control of an actuator coupled to the stick member in dependence upon the value FD.

The control unit may generate a signal to instruct the actuator to urge the stick member to a predetermined position when the control unit determines the value FD exceeds the predetermined tolerance limit.

The control unit may generate a signal to lock the actuator relative to the housing, thereby locking the stick member relative to the housing, when the control unit determines the value FD exceeds the predetermined tolerance limit.

The control unit may generate a signal to disable the actuator when the control unit determines the value FD exceeds the predetermined tolerance limit.

There is thus provided an inceptor apparatus, and method of operation of an inceptor apparatus, which in normal operation provides positional inputs to a control system for the control of the machine, but in the event that the stick member cannot be moved, the inceptor is operable to provide inputs to a control system for the control of the machine based on force applied to the stick member.

BRIEF DESCRIPTION OF THE DRAWINGS

Examples of the present disclosure will now be described with reference to the accompanying drawings, in which.

DETAILED DESCRIPTION

Figure 1:
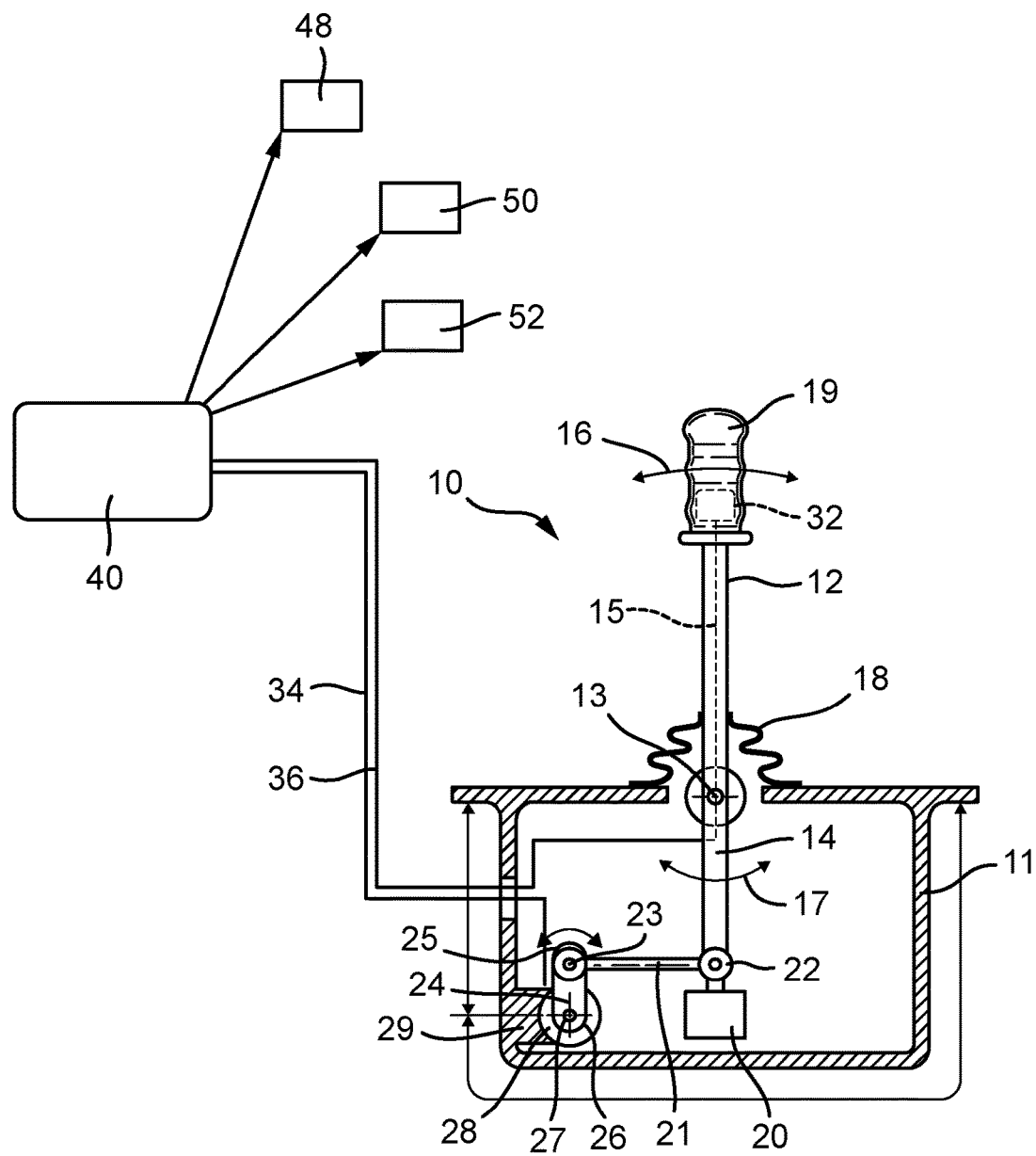
FIG. 1 shows a first example of an inceptor system according to the present disclosure.

FIG. 1 shows an example passive inceptor apparatus 10 which forms part of a vehicle control system of the present disclosure.

The inceptor 10 is intended for operation of a machine, for example a static device, a land base vehicle, a water based vehicle or an air vehicle. In the examples shown in FIG. 1 and FIG. 2 the system presented is suitable for piloting an aircraft.

The inceptor comprises a stick housing 11 and a stick member 12 (or "control stick", "side stick" or just "stick"), which are arranged such that the stick member 12 is pivotally mounted to the stick housing 11 at pivot point 13. In the example shown, the pivot point 13 acts to divide the stick member 12 into a first member section 14, contained within the stick housing 11, and a second member section 15, external to the stick housing 11. Normally, the stick housing 11 is fixed to a vehicle carrying the passive active stick apparatus 10. The pivot point 13 allows the stick member 12 to pivot with respect to the stick housing 11, as indicated by directional arrows 16 and 17. The control stick 12 is pivotably mounted about the pivot point 13 such that it may move in at least one of a first direction and second direction, the second direction being at right angles to the first direction. That is to say, the stick member 12 is pivotally mounted relative to the housing 11. The first direction may be an "x" direction (i.e. left and right, as shown in FIG. 1), or may be a "y" direction which is effectively in and out of the page as shown in FIG. 1. In this way, in use, the control stick may control an aircraft in pitch and roll directions.

A gaiter 18 can be provided between the second member section 15 and stick housing 11 to inhibit ingress of unwanted foreign material into the stick housing 11. At the one end of the second member section 15, distal from the pivot point 13, there is provided a grip (or grip portion) 19 suitable for engagement by an operator of the passive active stick apparatus 10, so that the operator can move the stick member 12 in either direction "x" shown by directional arrow 16, and at right angles to the direction shown (i.e. in the "y" direction).

A solid mass 20 may be attached to the first member section 14 at an end distal from the pivot point 13. The solid mass 20 is arranged to act as a counter balance to movement of the stick member 12 about pivot point 13 under external acceleration forces exerted on the stick member 12 and associated grip 19.

Also attached to the first member section 14, between the solid mass 20 and the pivot point 13, is a first link 21. A first end 22 of the first link 21 is pivotally coupled to the first member section 14 and a second end 23 is pivotally coupled to a second link 24. The second link 24 is pivotally attached to the first link 21 at a first end 25 and a second end 26 of the second link 24 is fixedly attached to an output drive axle 27 of a position sensor 28 responsive to, and for generating signals indicative of, stick member position. The position sensor 28 further comprises a housing 29 which is fixedly attached to the stick housing 11.

The position sensor 28 may be responsive to signals in the "x" and "y" directions. Additionally, two such position sensors 28 may be provided, one responsive to motion in the "x" direction, the other responsive to motion in the "y" direction.

Additional or alternative features to those described above may also form part of the apparatus 10, and features may be provided in a different form to that shown in the figures. For example, the connection of the stick member 12 to the position sensor 28 and/or the means by which the stick member 12 is pivotable relative to the housing 11 may have a different configuration.

There is also provided a force sensor 32 provided on the stick member 12 responsive to, and for generating signals indicative of, force applied to the stick member 12 by a user. The force sensor 32 may be provided under the grip 19, and in one example, may be responsive to forces in the "x" and "y" direction by being sensitive to the stress and/or strain imposed on the stick member 12 material.

There is also provided a control unit 40 operable to receive the position and force signals from the position sensor 28 and force sensor 32 respectively, via communication lines 34, 36. In the examples where the system presented is for an aircraft, and the control unit 40 may be a Flight Control Computer.

Figure 2:
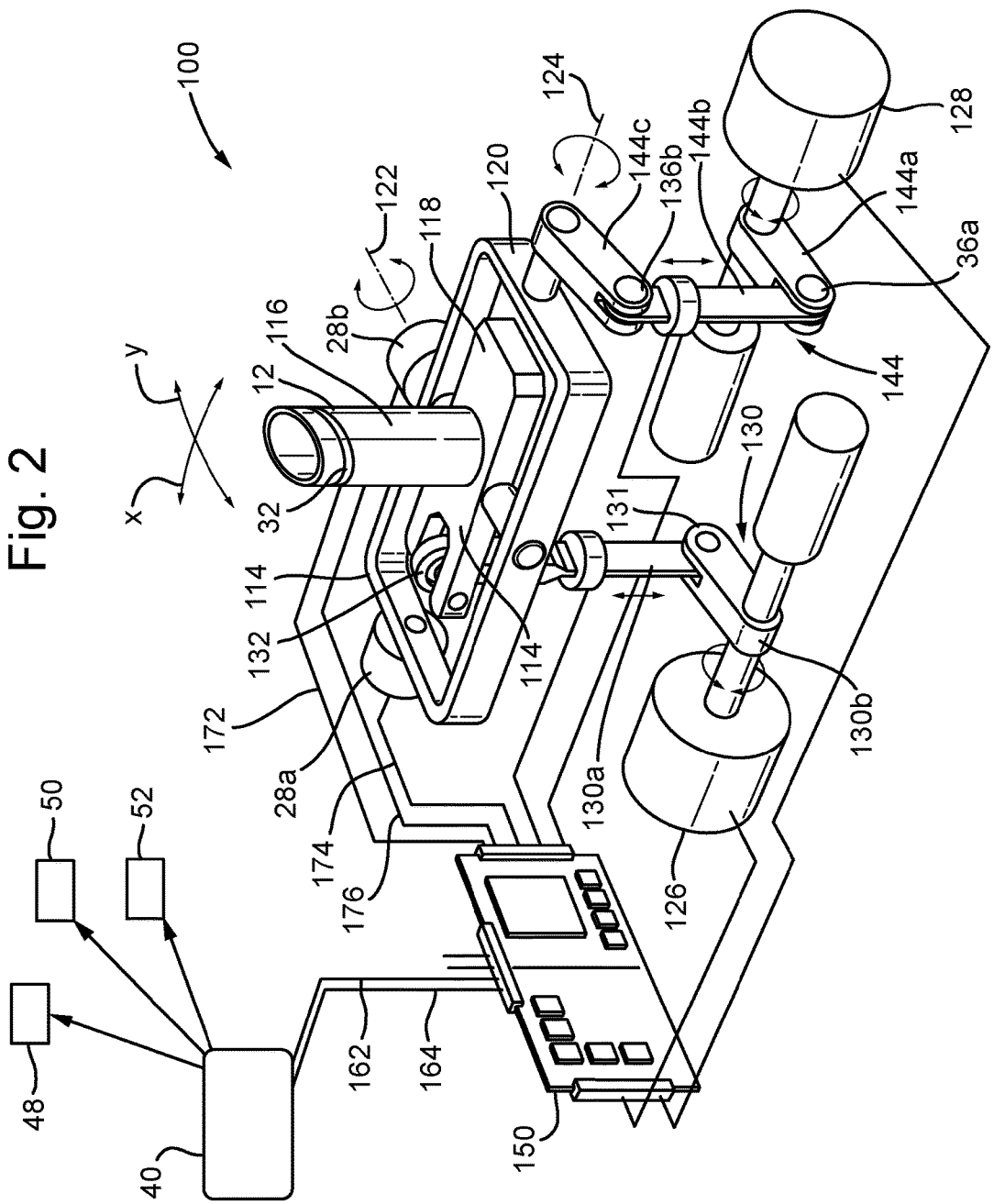
FIG. 2 shows a second example of an inceptor system according to the present disclosure.

As shown in FIG. 1, the control unit 40 outputs signals containing information and data to parts of the vehicle indicated generally at 48, 50, 52 as shown in FIG. 2, and thereby controls the vehicle.

FIG. 2 shows an example of a device of the present disclosure which includes an active inceptor 100. Features such as a support casing and the machine being operated by the inceptor apparatus 10 are not shown so as to avoid obscuring details of more relevant features of the device. In this example the stick member 12 is shown in a truncated form. That is to say the stick member 12 may extend further (i.e. be longer) as shown in FIG. 1. In this example the stick member 12 has a base portion 114 and a grip portion 116 which extends from the base portion 114. The grip portion 116, as its name suggests, is the part which will be handled by an operator, for example a pilot. Although shown as a plane tube in FIG. 2, and as with the example of FIG. 1, the grip portion 116 may comprise an ergonomic grip to make handling easier, and buttons for the operation of the vehicle.

The base portion 114 of the stick member 12 comprises a gimbal arrangement having a first base member 118, from which the stick member 12 extends, and a second base member 120. The stick member 12 extends from the first base member 118 in only one direction. That is to say, the stick member 12 terminates on the top side of the base member 118, and does not extend beneath the base portion 114. The first base member 118 is pivotably coupled to the second base member 120 to permit the stick member 12 and first base member 114 to rotate about a first axis of rotation 122 independently of the second base member 120. The second base member 120 is pivotably mounted such that the stick member 12, first base member 118 and second base member 120 are rotatable about a second axis of rotation 124 together. A force sensor 32 is provided on the stick member 12. The force sensor 32 provided on the stick member 12 is responsive to, and is operable to generate signals indicative of, force applied to the stick 12 by a user.

A first actuator 126 is coupled to the stick member 12 via the first base member 118. A second actuator 128 is coupled to the stick member 12 via the second base member 120. The actuators are operable in response to a signal from a control unit 40 to provide positional feedback to the stick member. For example, the actuators may be employed to prevent the pilot from moving the stick to an undesirable position, as determined by the control unit 40. In the example shown the first actuator 126 is coupled to the first base member 118 via a first arm 130. The arm 130 comprises a link 130a and link 130b which are joined at a pivotable joint 131 such that the arm 130 is articulated. The arm 130 is coupled to the first base member 118 by a bearing 132. The second actuator 128 is coupled to the second base member 120 by a second arm 144. The second arm 144 comprises a link 144a, link 144b and link 144c. Links 144a, 144b are joined at a pivotable joint 136a, and links 144b, 144c are joined at a pivotable joint 136b. Hence arm 144 comprises a double articulation. Link 144c is rigidly attached to the second base member 120. In the example shown actuators 126, 128 each comprise a motor held within a housing, and a shaft extending from the housing. The arms 130,144 are fixably connected to their respective shafts. Hence rotation of the shaft of the first actuator 126 will cause the stick 12 to rotate about the first rotational axis 122 in a first direction, indicated as "x" in FIG. 2. Likewise, rotation of the shaft of the second actuator 128 will cause rotation of the stick member 12 about the second rotational axis 124 in a second direction, shown as "y" in FIG. 2. In alternative examples the actuators may be provided as hydraulic devices, or any other appropriate type of actuator.

The first axis of rotation 122 is at right angles to the second axis of rotation 124. Likewise the first direction "x" and second direction "y" are at right angles to one another.

At least one of the first or second base members 118,120 is provided with a position sensor 28 (shown in different locations as 28a, 28b) configured to generate a position signal indicative of angle of rotation about their respective rotational axis. The position sensors 28 are operable to generate actual stick member position data. Hence the first base member 18 may be provided with a first position sensor 28a, and the second base member 120 may be provided with a second position sensor 28b.

The control unit 40 is configured to receive signals from the force sensor 32 and positional sensors 28a, 28b, for example by communication lines shown as lines 172, 174, 176, respectively. A processor 150 may be provided in series with the inceptor 100 and the control unit 40 to process and/or filter the data obtained from the sensors 32, 28 before the signals are passed to the control unit 40 via lines 162,164

The control unit 40 outputs signals containing various information to parts of the vehicle indicated generally at 48, 50, 52 as shown in FIG. 2, and thereby controls the vehicle.

In both examples shown in FIGS. 1 and 2, the control unit 40 is operable to process the signals according to a predetermined relationship to determine a value FD indicative of force applied to the stick member 12 relative to displacement of the stick member 12. The control unit 40 is also operable to generate machine control signals as a function of position signals and force signals in dependence upon the value FD for communication to the machine.

The inceptor and control unit 40 (flight control computer) may be provided as separate units and, in practice, may be spaced apart from one another, situated in different zones of the vehicle. The control unit 40 may also fulfil other functions as well as processing the signal data as herein described. The inceptor 10,100 and control unit 40 thereby combine to provide a flight control system.

For the main part, control of a machine using either of the inceptor apparatus' described above is identical.

In summary the method of operating an inceptor apparatus, according to the present disclosure, for controlling a machine, comprises the steps of receiving position and force signals from the position sensors 28 and force sensor 32 respectively; determining a value FD indicative of force applied to the stick member relative to displacement of the stick member, and generating machine control signals as a function of position signals and force signals in dependence upon the value FD for communication to the machine. The method is described in more detail below.

The control unit 40 is operable to process the position and force signals received from the position sensors 28 and force sensor 32 respectively. The position signals are indicative of angle of the stick member relative to a datum position. The sensors are intended to generate signals at all times unless specifically turned off. The control unit uses the signals to determine a value FD indicative of force applied to the stick member 12 relative to displacement of the stick member 12. That is to say the control unit 40 uses the signals to determine a value FD which is proportional to force applied to the stick member 12 as it is moved from one angle to another angle relative to a datum position (for example, a null "centred" position). The value FD may be determined incrementally as the stick is moved, for example for a fraction of a degree moved at a time.

The control unit 40 is operable to generate control signals in dependence upon the value FD for communication to the machine in dependence of the position signals and/or force signals.

When the control unit 40 determines that the value FD is below a predetermined tolerance limit, the control unit 40 generates machine control signals in dependence upon the force signals and position signals. Whilst operating within the predetermined tolerance limit, the inceptor apparatus 10,100 is deemed to be working normally.

In generating machine control signals, the control unit 40 varies its sensitivity to force signals and position signals dependent upon the amount of stick member 12 displacement. That is to say, during the step of generating machine control signals, the control unit applies a first variable gain multiplier to force signals, and applies a second variable gain multiplier to position signals, the values of the gain multipliers being varied relative to one another in dependence upon the amount of stick displacement.

For example, the function used to generate machine control signals is such that when the amount of stick member 12 movement is relatively small (i.e. when the user is making small adjustments to the position of the stick member), the force signal has a greater weighting than the position signal in controlling the machine (e.g. the first variable multiplier is set relatively high, and the second variable multiplier is set relatively low). When the stick member is at a centred (i.e. "null" position), the function is such that the machine is controlled in dependence on the force signals alone, and independent of the position signals (e.g. the second variable multiplier is set to zero). As the amount of displacement increases, the relative weighting (i.e. gain) applied to the force and position signal changes such that the machine is controlled upon force and position signals, or just position signals.

Additionally, or alternatively, where a passive inceptor is operating normally, or an active inceptor is operating normally in active mode, and the control unit determines the value FD is below a predetermined tolerance limit, the control unit 40 generates control signals in dependence upon the position signals but not force signals.

If the stick member 12 gets jammed, for example because the resistance to motion in the links increases due to wear, damage or foreign objects, then the force per degree of movement of the stick member 12 will exceed the predetermined tolerance limit. When the value FD exceeds the predetermined tolerance limit the control unit 40 generates control signals in dependence upon the force signals but not position signals. Having determined this, the control unit 40 will thus generate control signals to control the machine based on force signals only.

As described above with reference to FIG. 2, the control unit 40 generates signals for control of the actuator coupled to the stick member 12, the actuator control signals being determined in dependence upon the value FD.

When the control unit 40 determines the value FD exceeds the predetermined tolerance limit, the control unit 40 generates a signal to instruct the actuator to urge the stick member to a predetermined position. For example, the predetermined position may be a null inceptor position (i.e. centred, or "straight and level" for an aircraft). Thus the actuator will move the stick member 12 to an ergonomically easier position for the user to operate the machine when the stick member 12 is becoming overly difficult to move. The actuator 126,128 may be operable to slowly (i.e. over several seconds) motor back the stick member 12 to the null position.

When the control unit 40 determines the value FD exceeds the predetermined tolerance limit the control unit generates a signal to lock the actuator relative to the housing, thereby locking the stick member 13 relative to the housing. Thus, having determined there is a problem with the stick member and it may be difficult to move, but not yet immovable, the actuator will lock into a position so the stick member 12 is definitively fixed in position relative to the housing, and hence control of the machine will be done using force signals but not position signals.

When the control unit determines the value FD exceeds the predetermined tolerance limit the control unit generates a signal to disable the actuator. That is to say, in order to reduce current to the actuator, and in order to bring stability and certainty to the operation of the inceptor, the actuator will be turned off. This may happen after the actuator has been locked in position, or independently of the actuator being locked in position.

Likewise, the amount of current required by the actuators 126,128 (where present) to achieve desired stick position may also be used to determine if the stick member 12 is becoming jammed, even if not yet fully jammed. In this case the control unit 40 will generate control signals in dependence upon force and position signals, only position signals, or only force signal in response to the measured current being drawn by the actuators.

This arrangement is advantageous because although, in rare circumstances, the inceptor may lose positional input to control the machine (as described above) it is unlikely to lose position and force inputs. The probability of a dual event of both a jammed inceptor and loss of force sensor signals is very small, for example substantially less than $1 \times 10^{-9}$ pfh. Hence the force sensor 32 provides a useful mitigation against the stick member becoming immovable.

Thus provision of a force sensor 32 in/on the stick member 12, above any potential jamming point (for example above the stick member pivot point, towards or under the grip of the stick member), is advantageous because the force being applied to the stick member 12 by a pilot can be detected independently of the positional data generated by the inceptor 10,100.

Thus there is provided a means and method of controlling a machine even with a jammed inceptor 10,100. In an example where the machine is an aircraft, this is especially beneficial, as it increases the probably of a safe return to ground of the aircraft in the event of inceptor jam.

Although this clearly is advantageous in a single piloted aircraft, the device of the present disclosure may also be applied to aircrafts have more than one set of piloting controls.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An active inceptor apparatus for operating a machine, the apparatus comprising:
    a stick member having a grip portion, the stick member being pivotably mounted relative to a housing;
    a position sensor responsive to, and for generating position signals indicative of, a stick member position;
    a force sensor provided on the stick member responsive to, and for generating force signals indicative of, a force applied to the stick by a user; and
    a control unit, operable to
        receive the position and force signals from the position and force sensors respectively,
        process the position and force signals according to a predetermined relationship to determine a value FD indicative of the force applied to the stick member relative to a displacement of the stick member, and generate machine control signals as a function of at least one of the position signals and the force signals in dependence upon the value FD, for communication to the machine.

2. The inceptor apparatus of claim 1 wherein:
in response to the value FD being below a predetermined tolerance limit, the control unit is operable to generate machine control signals in dependence upon the position signals and the force signals.

3. The inceptor apparatus of claim 1 wherein:
in response to the value FD being below a predetermined tolerance limit, the control unit is operable to generate machine control signals in dependence upon the position signals but not the force signals.

4. The inceptor apparatus of claim 1 wherein:
in response to the value FD exceeding a predetermined tolerance limit, the control unit is operable to generate machine control signals in dependence upon the force signals but not the position signals.

5. The inceptor apparatus of claim 1 wherein the stick member is coupled to an actuator operable in response to at least one of the machine control signals from the control unit.

6. The inceptor apparatus of claim 5 wherein:
in response to at least one of the machine control signals received from the control unit, the actuator is operable to urge the stick member to a predetermined position.

7. The inceptor apparatus of claim 5 wherein:
in response to at least one of the machine control signals received from the control unit, the actuator is operable to be locked in position relative to the housing, thereby locking the stick member into position.

8. The inceptor apparatus claim 5 wherein:
in response to at least one of the machine control signals received from the control unit, the actuator is operable to be disabled.

9. The inceptor apparatus of claim 1 wherein:
the stick member is operable to pivot in a first direction and second direction, the first direction being perpendicular to the second direction.

10. A vehicle control apparatus comprising the inceptor apparatus of claim 1.

11. A method of operating an active inceptor apparatus for controlling a machine, the inceptor apparatus including a stick member having a grip portion, the stick member being pivotably mounted relative to a housing, the method comprising:
receiving position and force signals from position and force sensors respectively, the position sensor for generating the position signals indicative of a stick member position, and the force sensor for generating the force signals indicative of a force applied to the stick member by a user;
determining a value FD indicative of force applied to the stick member relative to displacement of the stick member; and
generating machine control signals as a function of at least one of the position signals and the force signals in dependence upon the value FD for communication to the machine.

12. The method of claim 11 wherein:
in response to the value FD being below a predetermined tolerance limit, generating machine control signals includes generating machine control signals in dependence upon the force signals and the position signals.

13. The method as claimed in claim 12 wherein generating machine control signals includes applying a first variable gain multiplier to the force signals, and applying a second variable gain multiplier to the position signals, the values of the gain multipliers being varied relative to one another in dependence upon the position signals.

14. The method of claim 11 wherein:
in response to the value FD being below a predetermined tolerance limit, generating machine control signals includes generating machine control signals in dependence upon the position signals but not the force signals.

15. The method of claim 11 wherein:
in response to the value FD exceeding the predetermined tolerance limit, generating machine control signals includes generating machine control signals in dependence upon the force signals but not the position signals.

16. The method of claim 11, the method further comprising generating the machine control signals for control of an actuator coupled to the stick member in dependence upon the value FD.

17. The method of claim 16 wherein:
in response to the value FD exceeding a predetermined tolerance limit, generating the machine control signals for control of an actuator includes generating a signal to instruct the actuator to urge the stick member to a predetermined position.

18. The method of claim 16 wherein:
in response to the value FD exceeding a predetermined tolerance limit, generating the machine control signals for control of an actuator includes generating a signal to lock the actuator relative to the housing, thereby locking the stick member relative to the housing.

19. The method of claim 16 wherein:
in response to the value FD exceeding a predetermined tolerance limit, generating the machine control signals for control of an actuator includes generating a signal to disable the actuator.

20. An active inceptor apparatus for operating a machine, the apparatus comprising:
a stick member having a grip portion, the stick member being pivotably mounted relative to a housing;
a position sensor responsive to, and for generating position signals indicative of, a stick member position;
a force sensor provided on the stick member responsive to, and for generating force signals indicative of, a force applied to the stick by a user; and
a control unit, operable to
receive the position and force signals from the position and force sensors respectively,
process the position and force signals according to a predetermined relationship to determine a value FD indicative of the force applied to the stick member relative to a displacement of the stick member, and
generate machine control signals as a function of at least one of the position signals and the force signals in dependence upon the value FD, for communication to the machine;
wherein
in response to the value FD being below a predetermined tolerance limit, the control unit is operable to generate machine control signals in dependence upon at least one of the force signals and the position signals, and
in response to the value FD exceeding the predetermined tolerance limit, the control unit is operable to generate machine control signals in dependence upon the force signals but not the position signals.

* * * * *